United States Patent
Yasumoto

[11] 3,892,006
[45] July 1, 1975

[54] MULTI-BLADED WIPER FOR WINDSHIELD-WIPER ASSEMBLY

[76] Inventor: Michio Yasumoto, 3909 N.E. 135th, Portland, Oreg. 97230

[22] Filed: Sept. 16, 1974

[21] Appl. No.: 506,469

[52] U.S. Cl. ......... 15/250.22; 15/250.36; 15/250.4; 15/250.41; 15/250.06
[51] Int. Cl.² ...................... B60S 1/44; B60S 1/38
[58] Field of Search ............... 15/250.01–250.06, 250.3, 250.36–250.41

[56] References Cited
UNITED STATES PATENTS

| | | | |
|---|---|---|---|
| 905,945 | 12/1908 | Spoorendonk | 15/250.22 X |
| 1,162,122 | 11/1915 | Yamada et al. | 15/250.22 |
| 1,197,763 | 9/1916 | Plotnitzky | 15/250.22 |
| 2,194,671 | 3/1940 | Pauro | 15/250.06 |
| 2,569,635 | 10/1951 | Holmes | 15/250.22 X |
| 2,689,369 | 9/1954 | Biek | 15/250.41 X |
| 2,712,148 | 7/1955 | Cheshire | 15/250.22 |
| 2,740,151 | 4/1956 | Wayne | 15/250.22 X |
| 2,787,803 | 4/1957 | Cella | 15/250.22 |

Primary Examiner—Peter Feldman
Attorney, Agent, or Firm—Chernoff & Vilhauer

[57] ABSTRACT

A rotatable wiper, substantially cylindrical in shape and adaptable for mounting on a conventional oscillating windshield wiper arm, comprising a plurality of radially-spaced, longitudinally-extending blade-pairs of resilient material formed around a flexible, heated shaft member for wiping moisture and other visibility-limiting matter from a vehicle windshield. The blades within each blade-pair are separated from one another and supported by a resilient planer spacer member which extends radially outward from the central shaft a distance slightly less than that of the blades and longitudinally the full length of the blades. The blade-pairs themselves are separated from one another and additionally supported by a plurality of resilient foam, wedge-shaped spacer members with radial and longitudinal dimensions equal to those of the inter-blade spacer members. As the wiper is drawn back and forth across the windshield by the wiper arm it is allowed to rotate freely on one pass and is locked with a blade-pair in perpendicular wiping contact with the windshield on the other, or return pass. Because of this unidirectional rotating action and the randomness with which the wiper rotates during its free-rolling pass, a substantially different blade-pair will be in wiping contact with the windshield during each locked pass. The wiper is heated by an electrical heating element located in the center of the wiper shaft and connected to an external power supply.

14 Claims, 9 Drawing Figures

MULTI-BLADED WIPER FOR WINDSHIELD-WIPER ASSEMBLY

BACKGROUND OF THE INVENTION

The present invention relates to rotating, multi-bladed windshield wipers of the type used to wipe dirt, insects and moisture from vehicle windshields. The problem of how to readily remove visibility-limiting matter from windshields has been in existence since their advent. Many attempts have been made to solve this problem: for example, by providing rotatable wipers with helical blades such as disclosed in Spoorendonk U.S. Pat. No. 905,945; Cysler U.S. Pat. No. 1,251,775; and Cheshire U.S. Pat. No. 2,712,148; linear blades such as those disclosed in Yamada et al. U.s. Pat. No. 1,162,122; Plotnitzky U.S. Pat. No. 1,197,763; Holmes U.S. Pat. No. 2,569,635; Kiker U.S. Pat. No. 2,648,087; and Cella U.S. Pat. No. 2,787,803; and knurled blades such as those disclosed in Pauro U.S. Pat. No. 2,194,671. In addition, various drive mechanisms have been employed to impart rotational movement to the wiper blade as it is drawn across the surface being cleaned, such as the gear-driven mechanism of Spoorendonk, the hand-settlable mechanism of Holmes, and the cable-driven mechanism of Kiker.

The prior art most pertinent to the present invention is that disclosed by Cella wherein a cam mechanism is used to rotate a three-bladed wiper so that a different blade is brought into contact with the windshield during every other pass of an oscillating wiper mechanism. After each wiping movement, one of the three blades is rotated past a cleaning brush while the wiper mechanism is returned to a starting position without a blade being held in contact with the windshield.

The main disadvantages of the rotatable wiper blades disclosed in the prior art are the inherent complexity of the driving mechanism, the fact that blades rotated in a direction opposite from that in which they are moved across a surface will tend to wear faster than blades that are either allowed to rotate freely or not rotated at all, and the fact that all but one of the rotating blades disclosed in the prior devices are formed around a rigid shaft and, therefore, are limited in their application to planar surfaces. While the wiper disclosed be Cella is sufficiently flexible to be used in other than planar surfaces, it presents the additional disadvantage of wiping the windshield surface during only one stroke of its two-stroke cycle. This disadvantage could become critical when the Cella wiper is used on a vehicle during heavy rainstorms or when following another vehicle at close range over a wet, dirty road.

SUMMARY OF THE INVENTION

The present invention is directed to a rotatable, multi-bladed windshield wiper of the type wherein a different blade is held in wiping contact with the surface of the windshield during each successive pass of an oscillating wiper arm mechanism and, more particularly, to a rotatable, multi-bladed wiper which is substantially cylindrical in shape and comprises a plurality of blade-pairs of resilient material formed along and radiating outwardly from a central flexible shaft. Between the two blades of each blade pair is a supportive planar spacer member of similar resilient material extending longitudinally the full length of the blade-pair and radially a distance slightly less than that of the blades.

An additional supportive spacer member, this one of resilient foam material and wedge-shaped cross-section, is used to separate each of the individual blade-pairs from one another. These spacers have radial and longitudinal dimensions similar to those of the planar inter-blade spacers. The resulting configuration is substantially cylindrical with each blade in each blade-pair extending a short distance beyond the basic cylindrical shape formed by the inter-blade and inter-blade pair spacers.

As the wiper of the present invention employs a flexible central shaft, in contradistinction to the rigid shaft of the wipers disclosed in the prior art, and is constructed entirely of resilient materials, it will more readily conform to the curved windshield surfaces found on most present day vehicles.

In use, the wiper is rotatably supported by an oscillating wiper arm mechanism such that during the first pass of its two-pass wiping cycle, the wiper is allowed to roll freely across the surface of the windshield. During the second, or return, pass the wiper is locked with one of its blade pairs oriented normal to, and held in wiping contact with, the windshield surface. Since the number of times that the wiper will roll during its free-rolling pass is dependent on several non-uniform factors, the orientation of any particular blade-pair at the end of the free-rolling pass is indeterminable. When the return pass begins, the wiper will be locked when, due to the wiper beginning to reverse its roll, a blade-pair is brought normal to the surface of the windshield. This locking of the wiper at the first instance that a blade-pair establishes normal contact with the windshield, coupled with the randomness of the number of wiper rotations during each free-rolling pass, statistically insures that a different blade-pair will be held in wiping contact with the windshield during each locked pass of the wiper arm mechanism. Thus, since all blade-pairs will be selected indiscriminately and, therefore, worn evenly, the multi-bladed wiper of the present invention will last many times longer than the conventional single-bladed wiper. For example, a rotatable wiper with six blade-pairs will last at least 6 times as long as the conventional wiper.

In addition, the use of blade-pairs, rather than a single wiping blade, will result in a more thorough and efficient cleaning and moisture removing action. Any moisture or other visibility-limiting matter not removed by the leading blade of the selected blade-pair will be removed by the trailing blade. Furthermore, as each blade in each blade-pair will naturally wear at different rates along its length, any streaking caused by uneven wear of the leading blade will be neutralized by the wiping action of the differently wearing trailing blade.

The foam spacer members between the blade-pairs not only separate and support the individual blade-pairs, but they also act as a moisture-absorption and distribution means. During each free-rolling pass of the wiper arm mechanism, moisture will be absorbed by the foam spacer material. After a short period of time, this moisture will be distributed evenly throughout the foam spacers so that with each succeeding cycle of the wiper mechanism, the area being cleansed will be alternately and evenly moistened and wiped dry. This unique dual-cleansing action, one pass rolling and moistening and one pass wiping, is a significant improvement over the single cleaning action of the wiper blade and mechanism disclosed by Cella, and is especially advantageous when the wiper of the present invention is used during a light or intermittent rain or when following at close range or trying to pass a large multi-tired vehicle on a wet or muddy road.

The mechanism used to limit the rotational movement of the wiper to one direction only can be a simple rachet wheel and pawl device wherein the rachet wheel is attached to the wiper and the pawl is attached to the wiper arm.

Located axially within the flexible central shaft member is a heating element used to supply heat to the wiper during cold weather to melt and help loosen frost, ice or snow from the windshield. Power for the heating element is obtained from a source external to the wiper; for example, from the vehicle's main electrical supply.

It is therefore a principal objective of the present invention to provide a rotatable, multi-bladed wiper blade capable of cleaning a curved surface.

It is an additional objective of the present invention to provide a rotatable, multi-bladed wiper that cleans on both passes of a two-pass wiping cycle.

It is a further objective of the present invention to provide a long-wearing wiper that will operate efficiently substantially longer than the conventional single-bladed wiper.

It is still a further objective of the present invention to provide a wiper utilizing a blade-pair to achieve more uniform and more thorough cleaning action than is possible with conventional wipers.

It is an advantage of the present invention that the rotational movement of the wiper can be controlled by a simple, unidirectional locking mechanism.

It is a principal feature of the present invention that the moisture wiped from the windshield is evenly distributed over the area being cleaned to more readily facilitate the rapid removal of visibility-inhibiting matter.

It is an additional feature of the present invention that the wiper may be heated by a centrally located element to speed the removal of frost, ice and snow from vehicle windshields during cold weather.

DETAILED DESCRIPTION OF THE INVENTION

Figure 2:
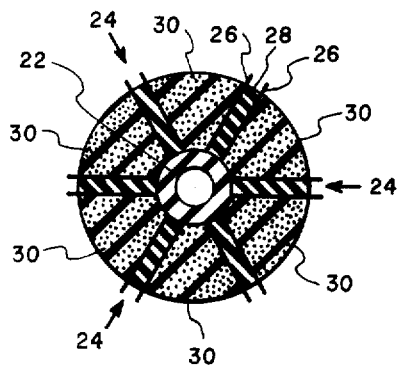
FIG. 2 is a cross-sectional view of the wiper of the present invention taken along lines 2—2 of FIG. 1.
Figure 1A:
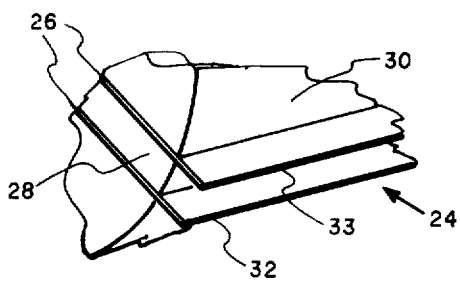
FIG. 1a is a detailed perspective view of a portion of the wiper of FIG. 1.
Figure 1:
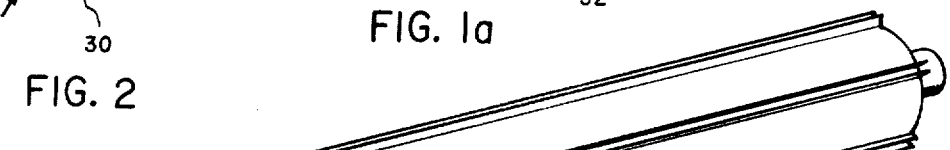
FIG. 1 is a prespective view of the preferred embodiment of the wiper of the present invention.

Referring to FIGS. 1, 1a and 2, the preferred embodiment of the present invention is seen to comprise a hollow cylindrical shaft member 22 surrounded by a plurality of outwardly-radiating blade pairs 24. These blade-pairs are formed from two parallel planar blades 26 of a resilient material such as neoprene or rubber and extend almost the full length of shaft member 22. Located between the two blades 26 of each blade pair is a planar spacer member 28, the radial width of which is slightly less than that of the blades. Blades 26 and spacers 28 may be adhesively attached to shaft member 22 or they may be formed along with the shaft as a single integrated unit. In addition, planar spacers 28 may be adhesively attached to or formed as part of blades 26.

Separating the individual blade-pairs from one another are a plurality of resilient foam, wedge-shaped spacer members 30 spaced around shaft member 22 as shown in FIG. 2. Each spacer 30 is adhesively attached to shaft member 22 and may also be adhesively attached to the adjacent blade-pairs. The radial width and the longitudinal length of spacer members 30 are the same as those of the planar spacer members 28; i.e., the radial width is slightly less than that of the blades 26. As a result, wiper 20 is substantially cylindrical in form with its surface, as shown in FIG. 1a, broken only by the protruding radial edges 32 and 33 of blade-pairs 24.

Fixedly attached to one end of shaft member 22 is ratchet wheel 34 which is employed as later described to limit the rotational movement of the wiper.

Figure 3:
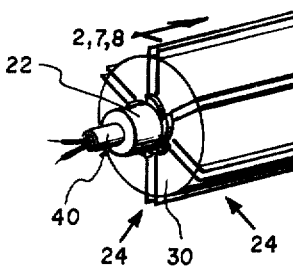
FIG. 3 is a front elevation of a vehicle windshield showing the wiper of the present invention in its operating position.
Figure 4:
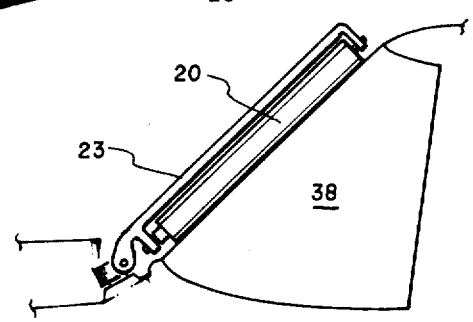
FIG. 4 is a side elevation of the wiper of the present invention mounted in a windshield wiper arm assembly.
Figure 5:
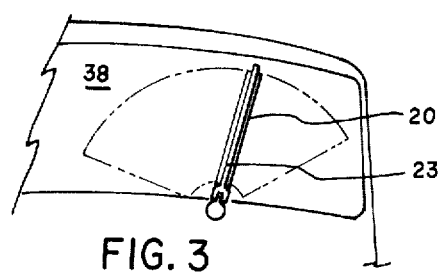
FIG. 5 is a series of end views of the wiper of the present invention during its free-rolling pass.
Figure 6:
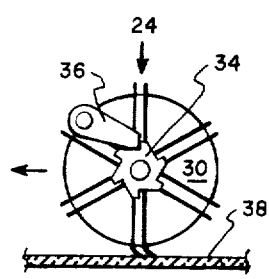
FIG. 6 is an end view of the wiper of the present invention during its locked pass.

In use, as indicated in FIGS. 3 and 4, wiper 20 is rotatably attached to an oscillating wiper arm 23 and associated drive mechanism similar to that used for a conventional windshield wiper. The rotational movement of the wiper is limited to one direction by the engagement of a pawl 36, which is pivotally attached to wiper arm 23, with the ratchet wheel attached to the wiper. As the wiper is held in contact and moved back and forth across windshield 38, it will roll freely during one pass of the wiper arm, as indicated in FIG. 5, and be locked during the return pass, as indicated in FIG. 6. The number and position of the ratchet wheel teeth corresponds to the number and position of the wiper blade-pairs so that when the ratchet wheel is engaged by the pawl, the wiper will be automatically positioned with one blade-pair oriented normal and held in wiping contact with the plane of windshield 38.

Figure 7:
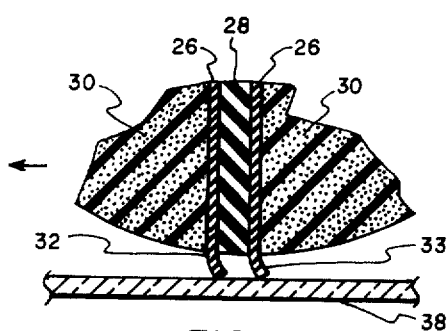
FIG. 7 is a detailed sectional view of the wiper of the present invention during its locked pass taken along lines 7—7 of FIG. 1.

Since the number of times the wiper will roll during its unlocked pass will vary due to the non-uniform cleanliness of the windshield surface and the resultant non-uniform coefficient of friction between the wiper components and the windshield surface, a statistically different blade-pair will be positioned and locked in normal contact with the windshield surface during each locked pass. As shown in FIG. 7, when the wiper is thus wiping the windshield during its locked pass, blade edges 32 and 33 will both be in wiping contact with the windshield to effectively remove any moisture or other visibility-limiting matter therefrom. The use of a blade-pair rather than a single blade provides a double-wiping action whereby any moisture or foreign matter not cleared from the windshield by leading blade edge 32 will be caught and cleared by trailing blade edge 33.

Figure 8:
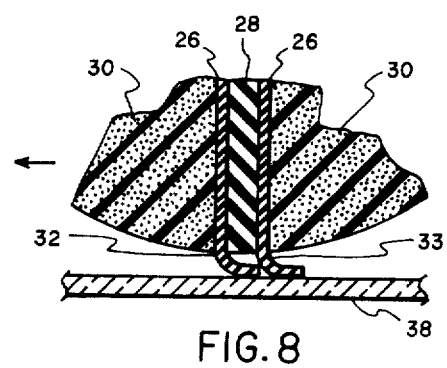
FIG. 8 is an alternate detailed sectional view of the wiper of the present invention during its locked pass taken along lines 8—8 of FIG. 1.

Alternately, if blade edges 32 and 33 are formed to protrude from the surface defined by spacer members 28 and 30 a distance substantially further than the distance between the two blades, as indicated in FIG. 8, leading blade edge 32 will be folded back and reinforcingly held against the windshield surface by similarly folded trailing edge 33. The result will be a more "squeegee-like" cleaning action than is obtained with the shorter blades of FIG. 7.

Threaded down the center of shaft member 22 is a heating element 40 formed from nichrome wire or other suitable material. Power for the heating element comes from the vehicle's main electrical power supply. During cold weather when ice, frost or snow is apt to form on the vehicle windshield, the heating element may be used to supply calorie-energy throughout wiper 20 as an aid in melting and removing the accumulated material from the windshield surface.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A windshield wiper assembly, adapted to be mounted on the oscillating wiper shaft of a conventional vehicle, comprising:
   a. a wiper support arm adapted for attachment to a wiper shaft;
   b. a flexible shaft member rotatably attached to said wiper support arm;
   c. a plurality of radially-projecting planar blades of resilient material spaced about and extending along the longitudinal axis of said shaft member; and
   d. means soley carried on said wiper support arm for limiting the rotational movement of said shaft member to one direction only.

2. The wiper assembly of claim 1 wherein said blades are grouped in pairs about the longitudinal axis of said shaft member to form a plurality of radially-projecting blade-pairs.

3. The wiper assembly of claim 2 further comprising:
   a. a plurality of planar spacer members attached to said shaft member and projecting radially a distance slightly less than said blades and extending longitudinally the full length of said shaft member, one of said planar spacer members being located between the two blades of each blade-pair; and
   b. a plurality of wedge-shaped spacer members attached to said shaft member and projecting radially a distance slightly less than said blades and extending longitudinally the full length of said shaft member, one of said wedge-shaped spacer members being located between each two blade-pairs.

4. The wiper assembly of claim 1 wherein said means for limiting the rotational movement of said shaft member comprises:
   a. a multi-toothed ratchet wheel fixedly attached to one of said shaft member and said wiper support arm; and
   b. a pawl pivotally attached to the other of said shaft member and said wiper support arm for unidirectional engagement with said ratchet wheel.

5. The wiper of claim 1 further comprising means for applying heat to the center of said flexible shaft.

6. A windshield wiper assembly, adapted to be mounted on the oscillating wiper shaft of a conventional vehicle, comprising:
   a. a wiper support arm adapted for attachment to a wiper shaft;
   b. a flexible shaft member rotatably attached to said wiper support arm;
   c. a plurality of radially-projecting planar blades of resilient material spaced about and extending along the longitudinal axis of said shaft member;
   d. a multi-toothed ratchet wheel fixedly attached to one of said shaft member and said wiper support arm; and
   e. a pawl pivotally attached to the other of said shaft member and said wiper support arm for unidirectional engagement with said ratchet wheel.

7. The wiper assembly of claim 6 further comprising a plurality of spacer members attached to said shaft member and projecting radially a distance slightly less than said blades and extending longitudinally the full length of said shaft member, one of said spacer members being located between each two blades.

8. A windshield wiper comprising:
   a. a flexible shaft member;
   b. a plurality of radially-projecting planar blades of resilient material spaced about and extending along the longitudinal axis of said shaft member; and
   c. a plurality of resilient wedge-shaped spacer members attached to said shaft member and projecting radially a distance slightly less than said blades and extending longitudinally the full length of said shaft member, one of said wedge-shaped spacer members being located between each two blades.

9. A windshield wiper comprising:
   a. a flexible shaft member;
   b. a plurality of radially-projecting planar blades of resilient material attached to said shaft member and extending longitudinally along the length thereof, said blades being grouped in pairs about the longitudinal axis of said shaft member;
   c. a plurality of planar spacer members attached to said shaft member and projecting radially a distance less than said blades and extending longitudinally the full length of said shaft member, one of said planar spacer members being located between the two blades of each blade pair; and
   d. a plurality of wedge-shaped spacer members attached to said shaft member and projecting radially a distance less than said blades and longitudinally the full length of said shaft member, one of said wedge-shaped spacer members being located between each two blade pairs.

10. The wiper of claim 9 wherein said planar blades are formed of a resilient solid material.

11. The wiper of claim 9 wherein said planar spacers are also attached to the blades on either side of said planar spacers.

12. The wiper of claim 9 wherein said wedge-shaped spacers are formed of a resilient sponge material.

13. The wiper of claim 9 wherein said wedge-shaped spacers are also attached to the blades on either side of said wedge-shaped spacer.

14. The wiper of claim 9 wherein the radial distance between the extreme longitudinal edge of each planar spacer member and the extreme longitudinal edges of its respective blade-pair is substantially equal to the distance between the two blades of said blade-pair.

* * * * *